July 15, 1947.  C. R. AUSTIN ET AL  2,423,958
CERAMIC BODY
Filed Nov. 16, 1944

INVENTORS
Chester R. Austin.
Edwin J. Rogers.
BY Corbett, Mahoney + Miller
ATTORNEYS Patented July 15, 1947

2,423,958

UNITED STATES PATENT OFFICE 2,423,958

CERAMIC BODY

Chester R. Austin, Columbus, Ohio, and Edwin J. Rogers, Troy, N. Y., assignors, by mesne assignments, to United Aircraft Corporation, East Hartford, Conn., a corporation of Delaware, and Ethyl Corporation, Detroit, Mich., a corporation of Delaware Application November 16, 1944, Serial No. 563,664

9 Claims. (Cl. 106—63)

This invention relates to ceramic bodies. More especially, it is concerned with the production of an electrical insulating material that is particularly adapted for spark-plug insulators and for uses requiring similar qualities.

The increasing use of ceramic insulators in aircraft engines has brought about a demand for spark-plug insulators of a superior quality. Porcelain spark-plug insulators were among the first used in internal combustion engines. Later, bodies of the mullite type were developed. The present demand for the best possible materials has brought about the development of bodies high in alumina. Initially, these bodies were made of almost pure alumina; however, in such cases extremely high burning temperatures of around 3200° F. or higher are required to effect the recrystallization that is necessary to produce the proper characteristics. Such high temperatures exceed the limits of most commercial kilns and, therefore, introduce serious production problems. Mica plugs are unsatisfactory for high-output engines.

The ideal spark-plug insulator must be resistant to thermal shock in order to withstand the marked fluctuations in temperature that occur in service. It must also have relatively high thermal conductivity so that sufficient heat is conducted away from the tip end to prevent pre-ignition. High thermal expansion is also desirable to insure that it expands and contracts as uniformly as possible with the metal parts with which it is assembled. In addition, of course, it must maintain its electrical insulating properties at the elevated temperatures to which it is subjected in service, and it must resist attack at elevated temperatures by lead compounds. However, inasmuch as most spark-plug failures can be traced, apparently, to insufficient strength, one of the most important characteristics of the ideal insulator is high mechanical strength. Sufficient strength is required to withstand both the stresses produced during assembly and the stresses that arise during service.

From a manufacturing standpoint, it is desirable that the ceramic body of the insulator retain its form and symmetry and that it have a uniform shrinkage. This uniformity makes possible the production of an article having close dimensional tolerances. In addition, the body should mature at a temperature below 3000° F. so that the insulators may be burned in commercially available kilns.

It is, therefore, one of the objects of our invention to provide a ceramic body suitable for spark-plug insulators having high mechanical strength, high thermal conductivity, high thermal expansion, and good electrical insulating properties and resistance to attack by lead compounds at elevated temperatures.

A further object of our invention is to produce such an insulator by a careful selection of ingredients to insure that losses occurring through warpage during firing are held to a minimum.

Another object of our invention is to provide, by careful selection of ingredients, an alumina-base ceramic body in which the alumina can be re-crystallized at temperatures below 3000° F.

A further object of our invention is to provide a ceramic body wherein good electrical properties are maintained at elevated temperatures even though an appreciable amount of alkalies may be present.

It is well known that various fluxes are effective to lower materially the re-crystallization temperature of alumina bodies. Such materials as MgO, BaO, CaO, $Fe_2O_3$, and $SiO_2$ have been proposed as fluxes for this purpose; however, none of these fluxes yield an insulator having all of the desired characteristics. If sufficient magnesia is added to lower the re-crystallization temperature, a magnesia spinel crystallizes in the cubic system and markedly lowers the strength of the resulting insulator. Additions of barium oxide also prevent the attainment of the desired strength. Calcium oxide, when added in amounts sufficient to decrease the burning temperature to the desired range, tends to produce bodies having an undesirably short burning range, a rather coarse crystal structure, and a definite tendency to warp badly during firing. The addition of significant amounts of $Fe_2O_3$ tends to result in a rather drastic loss of electrical insulating properties at elevated temperatures, particularly if the body is burned in a reducing atmosphere. Silica, when present in amounts adequate to lower the re-crystallization temperature to the desired range, tends to cause a marked loss of strength and resistance to thermal shock.

The above and other objects and advantages of our invention will appear in the following description and appended claims when considered in conjunction with the accompanying drawings which form a part of this specification.

Before explaining in detail the present invention it is to be understood that the invention is not limited in its application to the details illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention herein clamed beyond the requirements of the prior art.

We have found that alumina bodies having the requisite properties for spark-plug insulators can be produced by the addition of the proper amounts of calcium oxide and silica. Although neither of these materials is satisfactory when added singly, the desire results are obtained by the addition of the proper combination of the two as is hereinafter disclosed.

We have found also that it is particularly advantageous to introduce the calcium oxide into the body as tri-calcium penta-aluminate. We have further discovered that exceptional results are obtained when the tri-calcium penta-aluminate is fused and allowed to crystallize prior to its incorporation in the body.

Figure 1:
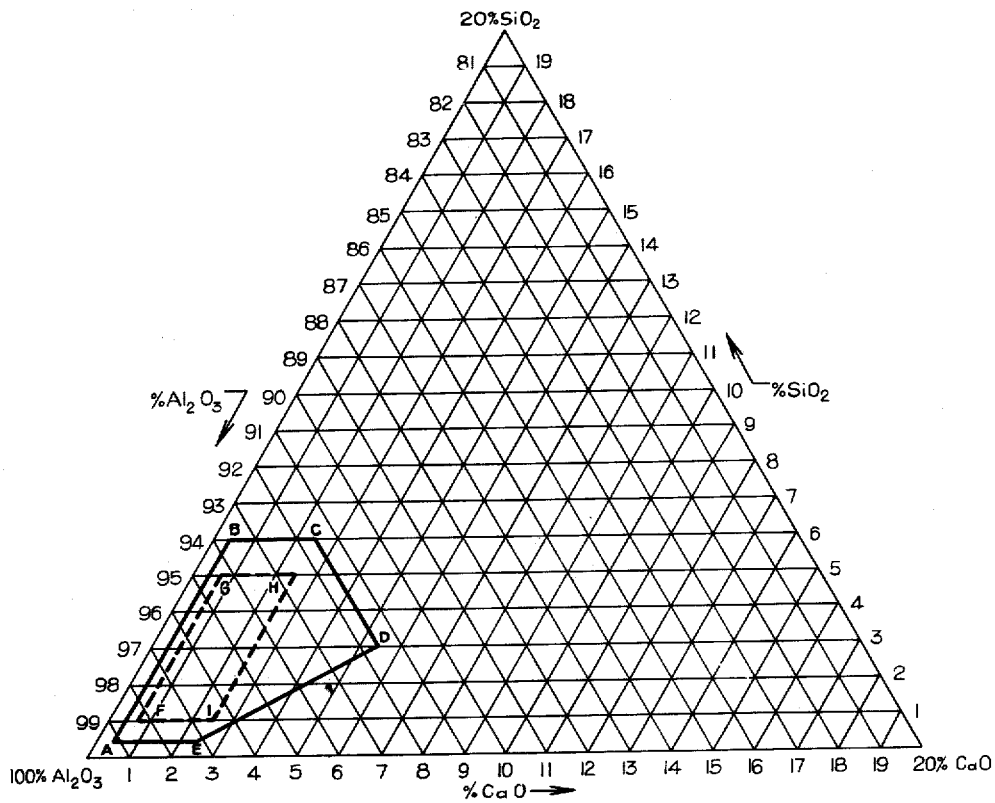
Figure 1 represents a corner of a triaxial diagram showing the relative proportions of alumina, calcium oxide, and silica used in the ceramic bodies coming within the scope of our invention.

In Figure 1 of the drawings, the respective sides of the triangle represent weight percentages of the three essential components of our ceramic body—alumina, calcium oxide, and silica. The left-hand side represents alumina contents varying from 80 to 100 per cent; the right-hand side represents silica contents varying from 0 to 20 per cent; while the base represents calcium oxide contents varying from 0 to 20 per cent.

As mentioned above, we have discovered that particularly desirable properties may be obtained in ceramic bodies composed essentially of alumina, calcium oxide, and silica. The compositions giving these desirable properties are approximately defined in Figure 1 by the solid lines AB, BC, CD, DE, and EA, the approximate coordinates of the points being: A—99.1 percent alumina, 0.4 per cent calcium oxide, and 0.5 per cent silica; B—93.6 per cent alumina, 0.4 per cent calcium oxide, and 6 per cent silica; C—91.5 per cent alumina, 2.5 per cent calcium oxide, and 6 per cent silica; D—91.5 per cent alumina, 5.5 per cent calcium oxide, and 3 per cent silica; and E—97 per cent alumina, 2.5 per cent calcium oxide, and 0.5 per cent silica. Within the area so defined, any composition selected will be suitable for use as spark-plug insulators or in other applications requiring similar properties.

Although excellent properties may be obtained in bodies having compositions within the range above described, in order to secure the very best properties with the optimum handling characteristics in commercial production, we prefer to employ compositions within a somewhat narrower range. We have found that the relative proportions of alumina, calcium oxide, and silica in the final body may advantageously be kept within the narrower limits represented in Figure 1 by the area approximately defined by the broken lines FG, GH, HI, and IF, the coordinates of the points being approximately: F—98.3 per cent alumina, 0.7 per cent calcium oxide, and 1 per cent silica; G—94.3 per cent alumina, 0.7 per cent calcium oxide, and 5 per cent silica; H—92.5 per cent alumina, 2.5 per cent calcium oxide, and 5 per cent silica; and I—96.5 per cent alumina, 2.5 per cent calcium oxide, and 1 per cent silica. The preferred compositions for the ceramic bodies of our invention, with respect to the relative proportions of alumina, calcium oxide, and silica, lie within this second lesser area which is wholly enclosed within the broader area first defined.

In other words, the ceramic bodies of our invention contain, in general, at least about 91.5 per cent of alumina, in excess of about 0.4 per cent of calcium oxide, and more than about 0.5 per cent of silica. However, the bodies preferably contain from about 92.5 to about 98.3 per cent of alumina, from about 0.7 to about 2.5 per cent calcium oxide, and from about 1 to about 5 per cent of silica. A particularly desirable body contains approximately 94.7 per cent alumina, 2.0 percent calcium oxide, and 3.3 per cent silica. Unless otherwise specified, all percentages referred to herein will be understood to represent percentages by weight.

While the triaxial diagram of Figure 1 shows the relative proportions of alumina, calcium oxide, and silica in a system consisting only of these three components, the ceramic bodies of our invention may also include small amounts of other substances. For example, we have found that ceramic bodies having excellent properties may be produced even though the alumina contains as much as 0.5 or 0.6 per cent alkali, expressed as $Na_2O$. Also, we have found that the calcium oxide may be obtained from a relatively pure calcium carbonate or, if desired, from a high-calcium limestone which may contain some incidental impurities. From the diagram, however, the relative proportions that the alumina, calcium oxide, and silica in the final body may bear to each other, may be determined regardless of what other nonessential ingredients may be present. In general, we prefer to keep the amounts of those nonessential ingredients as low as possible.

As a source of alumina, we may use any relatively pure grade; however, we prefer to use one of the various grades manufactured by the Bayer process. We have found that the best results are obtained when the alumina is calcined, preferably at a temperature in excess of 2000° F., prior to use in the body. As previously discussed, the alumina used in the ceramic bodies of our invention may contain as much as 0.5 or 0.6 per cent of alkali, expressed as $Na_2O$, without destroying the high electrical insulating properties at elevated temperatures.

Although, as mentioned hereinbefore, the calcium oxide may be added to the batch as calcium oxide or in any form, such as calcium carbonate or high-lime limestone, that will decompose during processing to yield calcium oxide, we prefer to add the calcium oxide to the body as tri-calcium penta-aluminate, and we have found that it is decidedly advantageous if the tri-calcium penta-aluminate is fused and allowed to crystallize prior to its incorporation in the batch.

In the preparation of fused tri-calcium penta-aluminate, we prefer that calcium carbonate or a high-calcium quicklime be used as the source of calcium oxide and that Bayer process alumina be used as the source of alumina. These materials, combined in the proper proportions, are then sintered or fused in an electric arc, or in any furnace capable of producing the temperature to effect combination, for example, approximately 3200° F.

We have used, for example, the following batch composition for the production of tri-calcium penta-aluminate by fusion in a direct-arc electric furnace: 26.9 per cent high-calcium quicklime (pebble) and 73.1 per cent Bayer alumina (calcined). The quicklime used in this batch contained 89.5 per cent calcium oxide, and the alumina contained practically 100 per cent alumina. Other sources of calcium oxide and alumina may be used; however, in any combination, the ingredients are proportioned to give an approximate molecular ratio of 3:5 for the calcium oxide and the alumina, respectively.

Chemical analyses of the solidified material from representative fusions gave the results shown in Table 1.

TABLE 1

*Chemical analyses of typical tri-calcium penta-aluminate fusions*

| Sample No. | Chemical Composition, Per Cent | | |
|---|---|---|---|
| | $Al_2O_3$ | $CaO$ | $SiO_2$[1] |
| 1 | 74.5 | 22.2 | 2.6 |
| 2 | 73.4 | 24.2 | 2.2 |
| 3 | 74.4 | 23.0 | 1.9 |
| 4 | 74.9 | 22.8 | 1.7 |
| 5 | 73.1 | 23.9 | 2.5 |
| 6 | 77.2 | 17.6 | 5.2 |

[1] Silica over about 0.9 per cent was introduced in grinding operation used to prepare samples for chemical analysis.

Petrographic examination of some of these samples indicates that they contain approximately 90 per cent of tricalcium penta-aluminate and from 5 to 10 per cent of mono-calcium aluminate, the balance being essentially a mixed mass of isolated crystals and glass.

In accordance with a preferred method of practising our invention, the tri-calcium penta-aluminate is ground so that a substantial amount will pass a 325-mesh sieve. For most purposes, we prefer that at least 90 per cent of the material is less than 325-mesh. Either dry or wet grinding may be employed; however, we have found that the best results can be most readily obtained by wet grinding, using alcohol as a medium. The wet material, if the wet process is used, is dried and is then ready for incorporation in the batch. If calcium carbonate, or some other material yielding calcium oxide during the subsequent processing, is used, the same general method of preparation is followed.

The alumina is also either dry or wet ground so that a substantial proportion, preferably at least 99 per cent, will pass through a 325-mesh sieve. We prefer to wet-grind, using an aqueous medium; and, if this procedure is followed, the fine alumina is dried and is then ready for use in the raw batch.

The silica to be added may be included with the alumina and ground at the same time, or it may be ground separately, either dry or wet, so that a substantial portion, preferably at least 99 per cent, passes a 200-mesh sieve.

The proper proportions of alumina, tri-calcium penta-aluminate (or other material forming calcium oxide on subsequent processing) and silica, selected to give the desired final ratio as hereinbefore disclosed, are then mixed with a suitable binder and/or plasticizer. An alternative method is to place these ingredients in a ball mill with alcohol or water and grind for a short time, say, one hour, dry, and then mix with the binder or plasticizer. Numerous materials can be used as binders and plasticizers; however, we have found that excellent results can be obtained by the use of various mixtures of such materials as water, ammonium oleate, colloidal protein material derived from kelp, and ammonium alginate. For example, the following is a typical raw batch: 88 per cent alumina, 10 per cent fused tri-calcium penta-aluminate, and 2 per cent silica; to this dry batch is added 19.3 per cent of water, 0.5 per cent of ammonium oleate, and 0.2 per cent of low-viscosity Cancoloid.

The raw batch is then thoroughly mixed. Various mixing devices can be used; for example, both Lancaster and Simpson mixers have given good results. The mixed batch may, if desired, then be passed through an aerator, dust mill, pulverizer, or other suitable machine to prepare it for use in fabrication.

The prepared batch is then fabricated into the desired shape or into a form from which the desired shape can be obtained by a further operation, such as machining or grinding. In some cases it is desirable to dry the fabricated piece before the machining or grinding operation. We have found pressure molding to be particularly applicable. The pressure used will vary with the shape and the intended application of the article being produced and with the amount and type of binder and plasticizer used; however, we have found that pressures of 5000 pounds per square inch or more are applicable for most purposes.

The fabricated article may then be dried and/or burned, or subjected to further forming operations and then dried and/or burned. The burning schedule may also vary considerably, depending upon the final application for which the ceramic body is to be used. In general, the schedule should be such that uniform heating is obtained and, especially in the production of spark-plug insulators, the time and the temperature of the burning must be adjusted to insure the production of a non-porous product. The porosity of the final body may be judged by immersion of the product in an alcohol-fuchsine dye solution at approximately 1000 pounds per square inch pressure for about ½ hour. The dye penetrates the porous areas, thereby disclosing their location. We have found that the following burning schedule produces excellent results on the ceramic bodies coming within the scope of our invention: Heat to about 2930° F. in approximately 14 hours, hold at that temperature for about 4 hours, and cool in place. However, burns in which the body was heated to 2750° F. in 1½ hours, held at that temperature for 6 hours, and cooled in place have produced satisfactory results.

In the practise of the present invention, we have found that the grinding of the various components of the batch in a porcelain mill with porcelain balls tends to introduce some silica into the materials. It will be understood, of course, that in discussing the limits of the various constituents we refer to the total silica content of the finished product, whether the silica is introduced separately, as pick-up during grinding, as impurities in the raw materials used, or as a combination of two or more sources. Under standard conditions, the amount of silica introduced extraneously remains relatively constant; therefore, the final silica content of the product may be regulated by the amount of silica added, as such, to the raw batch.

The effect of varying the percentages of the various components of our ceramic body is shown in the following tables. All of the bodies recorded were prepared as outlined above and were burned to 2930° F. in 14 hours, held at that temperature for 4 hours, and cooled in place. In the case of bodies having appreciable porosity, no compressive strength determinations were made.

Table 2 shows the effect of the calcium oxide content on the properties of bodies prepared in accordance with our invention from a mixture of alumina, calcium carbonate, and silica. These data indicate that the bodies tend to be porous when no calcium oxide is present. With the additions recorded, the addition of calcium carbonate to the batch in sufficient quantities to yield calcium oxide contents of from 1 to 5 per cent in the final body produced nonporous bodies having excellent strengths. With approximately 3.0 per cent of silica present, varying the calcium oxide content from 1 to 5 per cent does not markedly alter the compressive strength. The pick-up of silica during grinding, discussed previously, is clearly indicated; for example, although only 1.5 per cent of silica was added, as such, to batch No. 8324, the final body contained 3.0 per cent silica.

Table 3 shows the effect of the silica content on bodies prepared from alumina, calcium carbonate, and silica. As is indicated, in the absence of calcium oxide even as much as 5 per cent of silica is not effective in producing a nonporous body. These data also indicate that, in bodies containing approximately 2.3 per cent calcium oxide (added as calcium carbonate), some porosity may remain with silica contents as high as 2.0 per cent. In these bodies, when the silica content is raised to between 5 and 7.5 per cent, or higher, the strength falls off rather rapidly, thereby producing a less desirable body.

Table 4 shows the effect of calcium oxide content on bodies prepared from alumina, tri-calcium penta-aluminate, and silica. It will be noted that, with this mixture, as little as 0.5 per cent calcium oxide and 1.1 per cent silica produce bodies having excellent properties. Although batch No. 5513 gave a trace of dye penetration, this body was essentially non-porous as is indicated by the high compressive strength. It will also be noted that in these bodies the strength tends to fall off when the calcium oxide content is increased to about 3 per cent. This may be contrasted with batch No. 5548 listed in Table 2. In general, good bodies can be produced with somewhat higher calcium oxide contents when the calcium oxide is added as calcium carbonate than when it is added as tri-calcium penta-aluminate. On the other hand, lower silica contents can be used when the calcium oxide is added as tri-calcium penta-aluminate than when it is added as calcium carbonate.

Table 5 shows the effect of the silica content on bodies produced from alumina, tri-calcium penta-aluminate, silica mixtures. Again it will be noticed that bodies with relatively low strength are produced when the silica content exceeds about 6 per cent.

Tables 2, 3, 4 and 5, referred to above, appear in the following pages.

TABLE 2

*Effect of varying CaO content in ceramic bodies prepared from a mixture of alumina, calcium carbonate, and silica*

| Batch No. | Batch Composition, Per Cent | | | Burned Composition, Per Cent | | | Burned | | Dye Penetration |
|---|---|---|---|---|---|---|---|---|---|
| | $Al_2O_3$ | $CaCO_3$ | $SiO_2$ | $Al_2O_3$ by Difference | CaO | $SiO_2$ | Linear Shrinkage, Per Cent | Compressive Strength, Lb./Sq. In. | |
| 8324 | 98.5 | | 1.5 | 97.0 | | 3.0 | 21.4 | | Total. |
| 5504 | 96.25 | 1.77 | 1.98 | 96.0 | 1.0 | 3.0 | 22.8 | 222,000 | 0. |
| 5505 | 94.1 | 3.34 | 2.56 | 94.5 | 1.9 | 3.6 | 22.5 | 223,000 | 0. |
| 5546 | 92.82 | 5.23 | 1.95 | 94.03 | 3.0 | 2.97 | 22.5 | 224,000 | 0. |
| 5547 | 91.14 | 6.92 | 1.94 | 93.04 | 4.0 | 2.96 | 22.1 | 223,000 | 0. |
| 5548 | 89.50 | 8.58 | 1.92 | 92.05 | 5.0 | 2.95 | 21.8 | 225,000 | 0. |

TABLE 3

*Effect of varying $SiO_2$ content in ceramic bodies prepared from a mixture of alumina, calcium carbonate, and silica*

| Batch No. | Batch Composition, Per Cent | | | Burned Composition, Per Cent | | | Burned | | Dye Penetration |
|---|---|---|---|---|---|---|---|---|---|
| | $Al_2O_3$ | $CaCO_3$ | $SiO_2$ | $Al_2O_3$ by Difference | CaO | $SiO_2$ | Linear Shrinkage, Per Cent | Compressive Strength, Lb./Sq. In. | |
| 8676 [1] | 100 | | | 100 | | | 19.1 | | Total. |
| 8619 [1] | 96 | 4.0 | | 97.7 | 2.3 | | 17.3 | | Do. |
| 8322 | 100 | | | 98.5 | | 1.5 | 22.5 | | Slight. |
| 8326 | 96.5 | | 3.5 | 95.0 | | 5.0 | 20.9 | | Do. |
| 8327 | 96.0 | | 3.5 | 96.2 | 2.3 | 1.5 | 22.1 | | Do. |
| 8328 | 95.5 | 4.0 | 0.5 | 95.7 | 2.3 | 2.0 | 22.0 | | Do. |
| 8329 | 94.5 | 4.0 | 1.5 | 94.7 | 2.3 | 3.0 | 21.7 | | |
| 8330 | 93.4 | 4.0 | 2.6 | 93.7 | 2.3 | 4.0 | 21.3 | 195,000 | 0. |
| 8331 | 92.4 | 4.0 | 3.6 | 92.7 | 2.3 | 5.0 | 20.5 | 226,000 | 0. |
| 8332 | 90.0 | 4.0 | 6.0 | 90.2 | 2.3 | 7.5 | 19.4 | 236,000 | 0. |
| 8333 | 87.4 | 4.0 | 8.6 | 87.7 | 2.3 | 10.0 | 19.1 | 181,000 | 0. |
| | | | | | | | | 155,000 | 0. |

[1] Specially prepared alumina to give 0.0 silica content.

TABLE 4

*Effect of varying CaO content in ceramic bodies prepared from a mixture of alumina, tri-calcium penta-aluminate, and silica*

| Batch No. | Batch Composition, Per Cent | | | Burned Composition, Per Cent | | | Burned | | Dye Penetration |
|---|---|---|---|---|---|---|---|---|---|
| | $Al_2O_3$ | $3CaO.5Al_2O_3$ | $SiO_2$ | $Al_2O_3$ by Difference | CaO | $SiO_2$ | Linear Shrinkage, Per Cent | Compressive Strength, Lb./Sq. In. | |
| 5516 | 97.5 | 2.5 | ---- | 98.4 | 0.5 | 1.1 | 20.2 | 233,000 | 0. |
| 5513 | 95.0 | 5.0 | ---- | 97.8 | 1.0 | 1.2 | 21.9 | 233,000 | Trace. |
| 6213 | 90.0 | 10.0 | ---- | 96.7 | 2.0 | 1.3 | 21.8 | 206,000 | 0. |
| 5542 | 92.0 | 5.0 | 3.0 | 94.9 | 1.0 | 4.1 | 21.0 | 221,000 | 0. |
| 6216 | 87.0 | 10.0 | 3.0 | 92.7 | 2.0 | 4.3 | 20.1 | 238,600 | 0. |
| 5534 | 82.0 | 15.0 | 3.0 | 92.6 | 2.9 | 4.5 | 19.8 | 180,000 | 0. |
| 5530 | 77.0 | 20.0 | 3.0 | 91.6 | 3.8 | 4.6 | 18.7 | 129,000 | 0. |
| 5528 | 47.0 | 50.0 | 3.0 | 85.0 | 9.5 | 5.5 | 8.4 | -------- | Total. |

TABLE 5

*Effect of varying $SiO_2$ content in ceramic bodies prepared from a mixture of alumina, tri-calcium penta-aluminate, and silica*

| Batch No. | Batch Composition, Per Cent | | | Burned Composition, Per Cent | | | Burned | | Dye Penetration |
|---|---|---|---|---|---|---|---|---|---|
| | $Al_2O_3$ | $3CaO.5Al_2O_3$ | $SiO_2$ | $Al_2O_3$ by Difference | CaO | $SiO_2$ | Linear Shrinkage, Per Cent | Compressive Strength, Lb./Sq. In. | |
| 5513 | 95.0 | 5.0 | 0 | 97.8 | 1.0 | 1.2 | 21.9 | 233,000 | Trace. |
| 5514 | 94.4 | 5.0 | 0.6 | 97.2 | 1.0 | 1.8 | 21.9 | 240,000 | 0. |
| 6541 | 94.0 | 5.0 | 1.0 | 96.8 | 1.0 | 2.2 | 22.4 | 232,000 | 0. |
| 5515 | 92.6 | 5.0 | 2.4 | 95.4 | 1.0 | 3.6 | 21.1 | 234,000 | 0. |
| 5542 | 92.0 | 5.0 | 3.0 | 94.9 | 1.0 | 4.1 | 21.0 | 221,000 | 0. |
| 5543 | 90.0 | 5.0 | 5.0 | 92.9 | 1.0 | 6.1 | 20.0 | 179,000 | 0. |
| 5544 | 85.0 | 5.0 | 10.0 | 87.9 | 1.0 | 11.1 | 16.6 | 114,000 | 0. |
| 6213 | 90.0 | 10.0 | 0 | 96.7 | 2.0 | 1.3 | 21.8 | 206,000 | 0. |
| 6214 | 89.0 | 10.0 | 1.0 | 95.7 | 2.0 | 2.3 | 21.4 | 237,000 | 0. |
| 6215 | 88.0 | 10.0 | 2.0 | 94.7 | 2.0 | 3.3 | 21.0 | 238,000 | 0. |
| 6216 | 87.0 | 10.0 | 3.0 | 93.7 | 2.0 | 4.3 | 20.1 | 238,000 | 0. |
| 6217 | 86.0 | 10.0 | 4.0 | 92.7 | 2.0 | 5.3 | 19.8 | 214,000 | 0. |
| 6218 | 85.0 | 10.0 | 5.0 | 91.7 | 2.0 | 6.3 | 19.2 | 186,000 | 0. |
| 5540 | 80.0 | 10.0 | 10.0 | 86.9 | 1.9 | 11.2 | 17.0 | 130,000 | 0. |

The bodies made in accordance with our invention have excellent electrical properties. For example, a body containing approximately 95.2 per cent alumina, 2 per cent calcium oxide, and 2.8 per cent silica had a T. E. value, the temperature at which the material has a resistance of 1 megohm per centimeter, in excess of 1700° F.

The thermal expansion characteristics of our body are adequate for such applications as spark-plug insulators. As an example, a body containing approximately 94.7 per cent alumina, 2.0 per cent calcium oxide, and 3.3 per cent silica has a mean linear coefficient of expansion of $7.9 \times 10^{-6}$ per °C. over the temperature range of from 0 to 950° C. The coefficient of expansion is relatively uniform over the range; for example, the value is $5.6 \times 10^{-6}$ over the range from 0 to 100° C.

Twenty representative samples of our ceramic body were subjected to a thermal shock test comprising rapid heating of the tip of an insulator to 1600° F., by means of an oxygen-gas torch, followed by rapid cooling. None of the insulators tested failed after 300 cycles of the alternate heating and cooling. This test indicates that the spalling resistance of our body is adequate for extreme service conditions. Our ceramic body is also resistant to attack by lead compounds. Representative specimens showed negligible attack after immersion for one hour in molten lead oxide at 1800° F.

Figure 2:
Figure 2 shows a reproduction of a photomicrograph of a typical thin-section of one of the products of our invention.

Petrographic examination of fired bodies made according to our invention indicates that they have a unique crystallization of the alumina. The body is composed of a glassy phase and of alpha alumina crystals. The amount of glassy phase varies in quantity and amount depending upon the amount and the ratio of calcium oxide and silica present with the alumina in the body. It is characteristic of the products of our invention that the mass of alpha alumina crystals exhibit a porphyritic structure. The ground mass is composed substantially of alpha alumina crystals of equant form, the average diameter being of the order of 10 microns or less. It is also characteristic of our invention that the remainder of the alpha alumina crystals are needle-like or lath-like in form with a diameter as great as or greater than the average diameter of the crystals of the ground mass and a length of at least twice their diameter. It is this structure, we believe, that imparts the superior mechanical properties to the body. A reproduction of a photomicrograph of a typical thin-section of one of the products of our invention is shown as Figure 2.

Ceramic bodies were prepared from a batch containing 97.5 per cent alumina and 2.5 per cent tri-calcium penta-aluminate. The burned bodies contained approximately 98.4 per cent alumina, 0.5 per cent calcium oxide, and 1.1 per cent silica. Petrographic examination indicated that these bodies contained about 88 per cent alpha alumina and 12 per cent of glass.

Another series of bodies was prepared from a batch composed of 88 per cent of alumina, 10 per cent of tri-calcium penta-aluminate, and 2 per cent silica. The burned bodies contained approximately 94.7 per cent alumina, 2.0 per cent calcium oxide, and 3.3 per cent silica. Petrographic examination of these bodies showed that they contained from 80 to 82 per cent of alpha alumina crystals and from 18 to 20 per cent of the glass phase. The alpha alumina crystals of the ground mass were approximately 6 microns in diameter, while the needle-like crystals had an average diameter of 6 to 7 microns and an average length of 20 microns. Some of these lath-like crystals were as large as 17 by 75 microns. The needle-like phase comprised from 5 to 10 per cent of the total area. No trace of gehlenite (2CaO.Al$_2$O$_3$.SiO$_2$) or anorthite (CaO.Al$_2$O$_3$.SiO$_2$) was found in any of these bodies.

Another set of bodies was prepared from a batch composed of 40 per cent alumina, 50 per cent tri-calcium penta-aluminate, and 10 per cent silica. The final bodies contained about 88 per cent alumina, 9.5 per cent calcium oxide, and 12.5 per cent silica. The burned bodies were composed of about 70 to 75 per cent of alpha alumina crystals and from 25 to 30 per cent of glass, with gehlenite present in traces to 5 per cent. Part of the glass appeared to have an index of 1.638 and part had an index of 1.60 to 1.62, revealing the presence of two immiscible glasses. The coarse lath-like alpha alumina crystals were absent in the solid matrix.

A further series of bodies was prepared from a batch containing 94 per cent alumina, 3.4 per cent calcium carbonate, and 2.6 per cent silica. The burned bodies had an approximate composition of 94.3 per cent alumina, 1.9 per cent CaO, and 3.60 per cent silica and contained about 83 per cent of alpha alumina crystals and 17 per cent glass. The alpha alumina crystals of the matrix averaged about 5 microns in diameter. About 15 per cent of the area comprised the needle-like crystals having an average diameter greater than 15 microns. Some of these lath-like crystals had a diameter of 99 microns and a length of 251 microns.

From the foregoing description of our invention, it will be apparent that we have provided a novel ceramic body having a novel structure. The ceramic body of our invention has high mechanical strength, good electrical insulating properties, good thermal conductivity, and desirable resistance to spalling at elevated temperatures. The body is resistant to attack at elevated temperatures by lead compounds. A particularly advantageous characteristic of our body is the fact that the desirable properties may be obtained by burning at temperatures below 3000° F.

Although we have indicated that the properties of the product of our invention make it particularly well suited for use as a spark-plug insulator, it will be obvious that our ceramic body may be employed for other purposes, such, for example, as crucibles, thermo-couple protection tubes, extrusion dies, abrasion-resistant articles, heating element supports, general purpose electrical insulators, measuring gauges, nozzles and nozzle liners for use in applications involving resistance to the erosion action of hot gases and liquids, etc.

While some variations have been indicated in the method and the product of our invention, it will be readily understood that other modifications may be made within the scope of the appended claims.

Having thus described our invention, what we claim is:

1. A batch for the production of a ceramic body, said batch composed predominately of alumina and containing tri-calcium penta-aluminate and silica.

2. A batch for the production of a ceramic body, said batch composed predominately of alumina and containing fused tri-calcium penta-aluminate and silica.

3. A batch for the production of a ceramic body, said batch comprising essentially a mixture of at least 80 per cent of alumina, from about 2 to about 15 per cent of tri-calcium penta-aluminate, and sufficient silica to give a total silica content of from about 0.5 to about 6 per cent after final grinding.

4. A batch for the production of a ceramic body, said batch comprising essentially a mixture of about 87 per cent alumina, about 10 per cent of tri-calcium penta-aluminate, and sufficient silica to give a total silica content of about 3 per cent after final grinding.

5. A batch for the production of a ceramic body, said body comprising a major portion of alumina and a minor portion of calcium oxide, in which at least a part of the calcium oxide is added to said batch as tri-calcium penta-aluminate.

6. In a process for producing a ceramic body containing a major portion of alumina and a minor amount of calcium oxide, the step which comprises adding at least a part of the calcium oxide as tri-calcium penta-aluminate.

7. The method of making a ceramic body composed essentially of alumina, lime, and silica, said method comprising the steps of preparing a finely ground mixture of alumina, tri-calcium penta-aluminate, and silica, adding to said mixture a suitable binder and plasticizer, fabricating the mixture to the desired shape, and heating to a temperature sufficiently high to mature the body.

8. A batch for the production of a burned ceramic body, said batch composed predominantly of alumina and containing tri-calcium penta-aluminate and silica in amounts sufficient to give a burned body in which the relative percentages of said three ingredients lie within the area defined approximately in the accompanying Figure 1 by the solid lines AB, BC, CD, DE and EA.

9. A batch for the production of a burned ceramic body, said batch composed predominantly of alumina and containing fused tri-calcium penta-aluminate and silica in amounts sufficient to give a burned body in which the relative percentages of said three ingredients lie within the area defined approximately in the accompanying Figure 1 by the broken lines FG, GH, HI and IF.

CHESTER R. AUSTIN.
EDWIN J. ROGERS.

REFERENCES CITED

The following references are of record in the file of this patent:

UNITED STATES PATENTS

| Number | Name | Date |
|---|---|---|
| 954,808 | Jeppson et al. | Apr. 12, 1910 |
| 1,528,639 | Tone | Mar. 3, 1925 |
| 1,741,920 | Curtis | Dec. 31, 1929 |
| 954,766 | Saunders | Apr. 12, 1910 |
| 1,931,795 | Heilman | Oct. 24, 1933 |
| 1,942,431 | Jung | Jan. 9, 1934 |
| 1,966,407 | Hauman | July 10, 1934 |
| 1,966,408 | Hauman | July 10, 1934 |
| 2,019,209 | Benner et al. | Oct. 29, 1935 |

(Other references on following page)

| Number | Name | Date | Number | Name | Date |
|---|---|---|---|---|---|
| 71,229 | Seymour | Nov. 19, 1867 | 2,277,705 | Kinzie et al. | Mar. 31, 1942 |
| 1,942,879 | Riddle | Jan. 9, 1934 | 2,341,561 | Kinzie et al. | Feb. 15, 1944 |
| 2,043,029 | Blau et al. | June 2, 1936 | 2,277,735 | Wainer et al. | Mar. 31, 1942 |
| 2,047,457 | Benner et al. | July 14, 1936 | 2,323,951 | Wainer | July 13, 1943 |
| 269,236 | Klingler et al. | May 11, 1943 | 2,207,558 | Sulger | July 9, 1940 |
| 2,272,618 | Fessler et al. | Feb. 10, 1942 | | | |
| 2,331,232 | Ross | Oct. 5, 1943 | | FOREIGN PATENTS | |
| 2,220,411 | Kinzie et al. | Nov. 5, 1940 | Number | Country | Date |
| 2,220,412 | Kinzie et al. | Nov. 5, 1940 | 373,111 | Italy | 1939 |

Certificate of Correction

July 15, 1947.

Patent No. 2,423,958.

CHESTER R. AUSTIN ET AL.

It is hereby certified that errors appear in the printed specification of the above numbered patent requiring correction as follows: Column 3, line 14, for "clamed" read *claimed*; line 21, for "desire" read *desired*; column 6, line 63, for "same" read *some*; column 10, line 42, for "end" read *and*; and that the said Letters Patent should be read with these corrections therein that the same may conform to the record of the case in the Patent Office.

Signed and sealed this 30th day of September, A. D. 1947.

[SEAL]

THOMAS F. MURPHY,
*Assistant Commissioner of Patents.*

| Number | Name | Date | Number | Name | Date |
|---|---|---|---|---|---|
| 71,229 | Seymour | Nov. 19, 1867 | 2,277,705 | Kinzie et al. | Mar. 31, 1942 |
| 1,942,879 | Riddle | Jan. 9, 1934 | 2,341,561 | Kinzie et al. | Feb. 15, 1944 |
| 2,043,029 | Blau et al. | June 2, 1936 | 2,277,735 | Wainer et al. | Mar. 31, 1942 |
| 2,047,457 | Benner et al. | July 14, 1936 | 2,323,951 | Wainer | July 13, 1943 |
| 269,236 | Klingler et al. | May 11, 1943 | 2,207,558 | Sulger | July 9, 1940 |
| 2,272,618 | Fessler et al. | Feb. 10, 1942 | | | |
| 2,331,232 | Ross | Oct. 5, 1943 | | FOREIGN PATENTS | |
| 2,220,411 | Kinzie et al. | Nov. 5, 1940 | Number | Country | Date |
| 2,220,412 | Kinzie et al. | Nov. 5, 1940 | 373,111 | Italy | 1939 |

Certificate of Correction

July 15, 1947.

Patent No. 2,423,958.

CHESTER R. AUSTIN ET AL.

It is hereby certified that errors appear in the printed specification of the above numbered patent requiring correction as follows: Column 3, line 14, for "clamed" read *claimed*; line 21, for "desire" read *desired*; column 6, line 63, for "same" read *some*; column 10, line 42, for "end" read *and*; and that the said Letters Patent should be read with these corrections therein that the same may conform to the record of the case in the Patent Office.

Signed and sealed this 30th day of September, A. D. 1947.

[SEAL]

THOMAS F. MURPHY,
*Assistant Commissioner of Patents.*